A. A. JOHNSON.
MILK SAMPLING AND MEASURING DEVICE.
APPLICATION FILED MAR. 18, 1909.
942,648.
Patented Dec. 7, 1909.
2 SHEETS—SHEET 1.
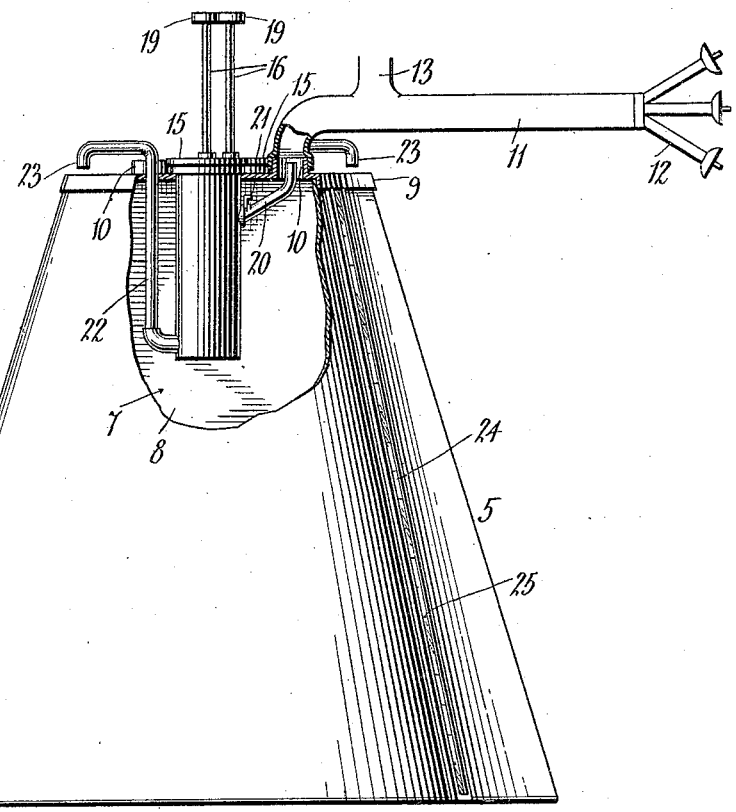
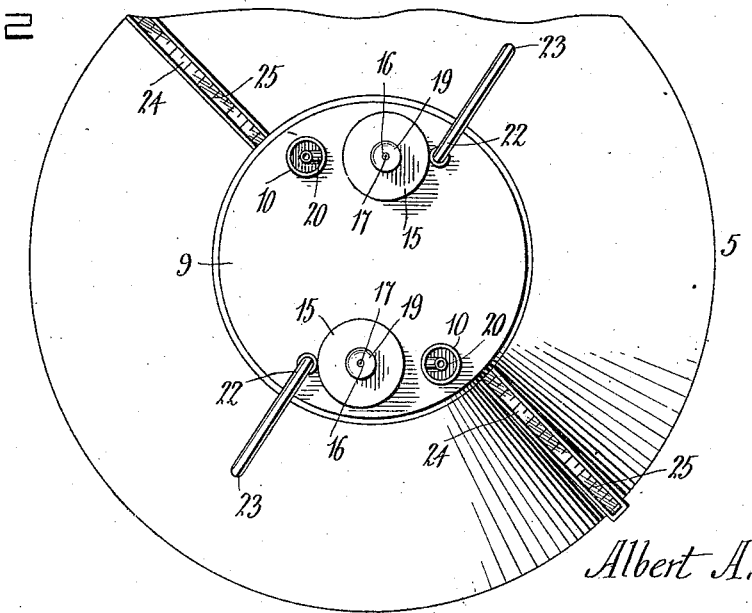
Witnesses
Inventor
Albert A. Johnson
By
Attorneys

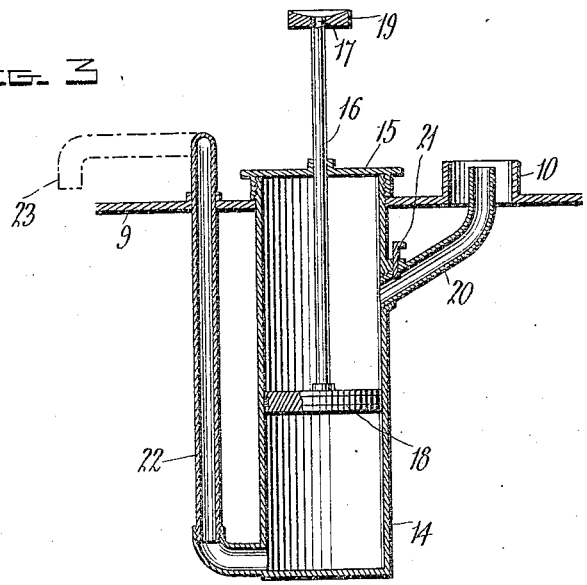
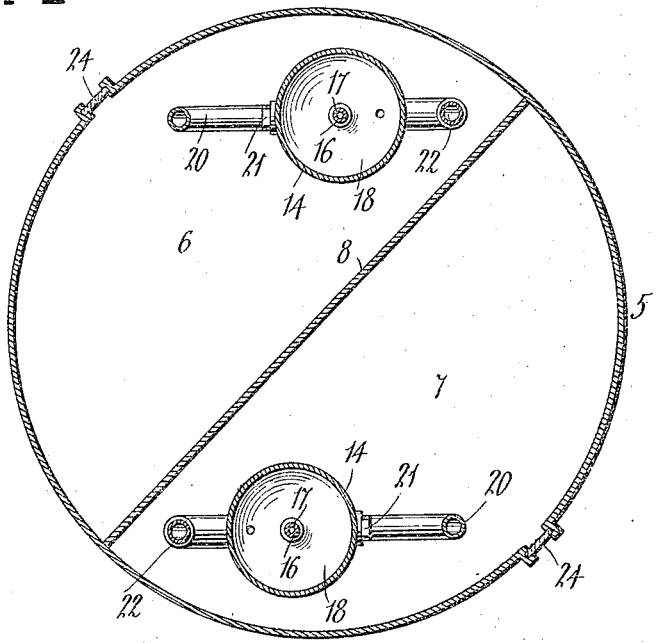

UNITED STATES PATENT OFFICE.

ALBERT A. JOHNSON, OF MARINETTE, WISCONSIN.

MILK SAMPLING AND MEASURING DEVICE.

942,648.

Specification of Letters Patent.

Patented Dec. 7, 1909.

Application filed March 18, 1909. Serial No. 484,164.

*To all whom it may concern:*

Be it known that I, ALBERT A. JOHNSON, a citizen of the United States, residing at Marinette, in the county of Marinette, State of Wisconsin, have invented certain new and useful Improvements in Milk Sampling and Measuring Devices; and I do hereby declare the following to be a full, clear, and exact description of the invention, such as will enable others skilled in the art to which it appertains to make and use the same.

The invention relates to a milk sampling and measuring device and more particularly to that class of devices adapted for use with milking machines.

The primary object of the invention is the provision of a device of this character in which the milk from a cow may be accumulated for testing or sampling purposes independently of the quantity of milk deposited in a receptacle or the like and means to enable the measuring of the milk deposited in the latter.

Another object of the invention is the provision of a device of this character which is simple in construction, readily and easily manipulated, thoroughly efficient in operation and inexpensive in the manufacture.

With these and other objects in view the invention consists in the construction, combination and arrangement of parts as will be hereinafter more fully described in detail, illustrated in the accompanying drawings which disclose the preferred form of embodiment of the invention to enable those skilled in the art to practice, and brought out in the claims hereunto appended.

In the drawings:—Figure 1 is a side elevation of the invention with the receptacle partly broken away. Fig. 2 is a fragmentary top plan view. Fig. 3 is a longitudinal sectional view through one of the samplers. Fig. 4 is a transverse sectional view.

Similar reference characters indicate corresponding parts throughout the several views in the drawings.

In the drawings the numeral 5 designates a measuring receptacle with a contracted mouth portion, however this receptacle may be of any other desirable shape and is divided into independent compartments 6 and 7 respectively, by a dividing or partition wall 8, so that the receptacle will hold different or independent quantities of liquid.

Detachably mounted over the mouth portion of the receptacle 5, is a cover or lid 9, the same formed with annular flanged inlet openings 10, to permit the ingress of liquid into the compartments 6 and 7 in the receptacle. Connected to the flanged inlets 10, are flexible tubes 11, the same having at their outer free ends the usual teat nozzles 12, to permit milk from cows to be delivered and deposited in the receptacle. Each flexible tube is formed with a branch 13, to which latter is adapted to be connected a suction device (not shown) to effect the flow of milk from the cow to within the receptacle. Secured to the cover or lid 9, and depending into each of said compartments 6 and 7 respectively, is a sample depository 14, in the form of a cylinder having at its upper end a removable centrally perforated cap 15, in the perforation of which is slidably mounted a plunger rod 16, the latter having a central air duct or bore 17, and to the inner end of said rod is connected a piston or piston head 18, which latter corresponds to the interior diameter of the depository 14, and is adapted to move longitudinally within the same. To the opposite end of the rod 16 is connected a finger button or piece 19, to enable an operator to reciprocally move the rod and its piston head.

In communication with the depository 14, and intersecting the inlet opening 10, is an inclined inlet pipe or tube 20, which latter is adapted to receive a quantity of the fluid as it is being delivered into the receptacle 5, to convey it to the sample depository. Mounted in the inlet tube 20, is a slide valve 21, which latter is for controlling the supply of fluid to the depository.

Leading from the lower end of the depository 14, is a delivery pipe 22, the latter passing up through the cover 9, and terminating in a discharge nozzle 23, projecting beyond the marginal edge of the said cover and disposed a distance above the same.

At diametrically opposite sides of the receptacle 5, are suitable side openings for the respective compartments therein, and which openings extend throughout the length of the receptacle and are covered by glass panels 24, each provided with a graduating scale 25, so as to indicate the quantity of fluid such as milk deposited within the receptacle.

From the foregoing description it is thought the construction and operation of the invention will be clearly apparent therefore a more extended explanation has been omitted.

What is claimed is:—

1. The combination with a receptacle, of a closure therefor, having an inlet port, a sample depository depending from the closure within the receptacle, a piston working in said depository, an inlet pipe in communication with the depository and intersecting said inlet port, and a delivery pipe leading from said depository.

2. The combination with a receptacle having independent compartments, of a cover fitted on said receptacle, supply means in communication with the compartments, respectively, sample depositories supported by the cover and depending into the compartments, means forming communication between each of said depositories and the supply means, delivery means leading from each of said depositories, and means for effecting the discharge of contents from the depositories through said delivery means.

3. The combination with a receptacle, of a closure therefor, having an inlet port, a sample depository depending from the closure within the receptacle, a piston working in said depository, an inlet pipe in communication with the depository and intersecting said inlet port, a delivery pipe leading from said depository, and a regulating slide controlling the communication through the inlet pipe.

In testimony whereof, I affix my signature, in presence of two witnesses.

ALBERT A. JOHNSON.

Witnesses:
JOHN MOORE,
L. M. EVERT.